US008764090B2

(12) United States Patent
Kerr

(10) Patent No.: US 8,764,090 B2
(45) Date of Patent: Jul. 1, 2014

(54) VEHICLES INCORPORATING TAILGATE ENERGY MANAGEMENT SYSTEMS

(71) Applicant: Toyota Motor Engineering & Manufacturing North America, Inc., Erlanger, KY (US)

(72) Inventor: Norman C. Kerr, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/667,134

(22) Filed: Nov. 2, 2012

(65) Prior Publication Data

US 2013/0060403 A1 Mar. 7, 2013

Related U.S. Application Data

(63) Continuation-in-part of application No. 13/207,787, filed on Aug. 11, 2011.

(51) Int. Cl.
*B62D 33/03* (2006.01)

(52) U.S. Cl.
USPC .......................... 296/50; 296/57.1; 296/146.4

(58) Field of Classification Search
USPC ................................ 296/50–62, 146.8, 146.4
See application file for complete search history.

(56) References Cited

U.S. PATENT DOCUMENTS

| | | | | |
|---|---|---|---|---|
| 6,276,743 | B1 * | 8/2001 | Jyawook et al. | 296/155 |
| 6,357,813 | B1 * | 3/2002 | Vandeberghe et al. | 296/57.1 |
| 6,719,356 | B2 * | 4/2004 | Cleland et al. | 296/146.8 |
| 6,783,167 | B2 | 8/2004 | Bingle et al. | |
| 6,997,488 | B2 | 2/2006 | Kurten et al. | |
| 7,201,430 | B2 | 4/2007 | Sakai et al. | |
| 7,484,784 | B2 * | 2/2009 | Ohly | 296/57.1 |
| 7,651,141 | B2 | 1/2010 | Kraenzle | |
| 8,164,447 | B2 | 4/2012 | Wittke | |
| 2007/0132264 | A1 * | 6/2007 | Koneval et al. | 296/57.1 |
| 2008/0191499 | A1 | 8/2008 | Stein | |

* cited by examiner

*Primary Examiner* — Glenn Dayoan
*Assistant Examiner* — Gregory Blankenship
(74) *Attorney, Agent, or Firm* — Dinsmore & Shohl LLP

(57) ABSTRACT

A vehicle includes sidewalls, a tailgate located proximate to rear ends of the sidewalls, and a tailgate energy management system. The tailgate energy management system includes a governor coupled to one of the sidewalls and to the tailgate. The governor selectively applies a governing force to the tailgate to reduce an opening speed of the tailgate. The tailgate energy management system also includes a speed sensor sensing an opening speed of the tailgate and an electronic control unit electronically coupled to the governor and the speed sensor. The electronic control unit includes a processor and memory storing an instruction set. The electronic control unit receives a speed signal indicative of the opening speed of the tailgate and the processor executes the instruction set to cause the electronic control unit to transmit a control signal to the governor to slow the opening speed of the tailgate based on the speed signal.

16 Claims, 8 Drawing Sheets

VEHICLES INCORPORATING TAILGATE ENERGY MANAGEMENT SYSTEMS

CROSS-REFERENCE TO RELATED APPLICATIONS

This application is a continuation-in-part of application Ser. No. 13/207,787 filed Aug. 11, 2011.

TECHNICAL FIELD

The present disclosure is generally directed to tailgate energy management systems for vehicles and vehicles incorporating tailgate energy management systems that limit the opening speed of tailgates.

BACKGROUND

Vehicles having deployable tailgates, for example, pickup trucks, passenger vans, and sport utility vehicles (SUVs), may include lift assist devices that reduce the amount of force required to be applied by a user to control the motion of the tailgates as they are moved between open and closed positions. The lift assist devices may include gas dampers and/or torsion springs that apply a direction force to the tailgate that allows for easier opening and/or closing of the tailgate.

However, lift assist devices may not apply a force of variable intensity to accommodate a variety of conditions that the vehicle may be subject to. Using a pickup truck as an example, the opening speed (and therefore opening energy) of a tailgate may vary depending on vehicle inclination, ambient temperature, and/or gas damper wear. The variability in opening energy may be problematic in applications where the user chooses to open a tailgate while at a remote location, for example, when using a remote keyless entry system. In such an application, tailgates that contact surrounding objects while opening with energy greater than a predefined threshold energy may cause damage to the tailgate and/or the surrounding object.

Accordingly, vehicles incorporating tailgate energy management systems are desired.

SUMMARY

In one embodiment, a vehicle includes sidewalls spaced laterally apart from one another, a tailgate located proximate to rear ends of the sidewalls, and a governor coupled to one of the sidewalls and to the tailgate. The governor selectively applies a governing force to the tailgate to reduce an opening speed of the tailgate. The vehicle also includes a speed sensor sensing an opening speed of the tailgate and an electronic control unit electronically coupled to the governor and the speed sensor. The electronic control unit includes a processor and memory storing a computer readable and executable instruction set. The electronic control unit receives a speed signal indicative of the opening speed of the tailgate from the speed sensor and the processor executes the instruction set to cause the electronic control unit to transmit a control signal to the governor such that the governor slows the opening speed of the tailgate based on the speed signal.

In another embodiment, a vehicle includes sidewalls spaced laterally apart from one another, a tailgate located proximate to rear ends of the sidewalls, and a retractable cable assembly having a cable coupled to the tailgate and a rotatable drum about which the cable is wound. The vehicle also includes a governor coupled to the sidewalls and to the rotatable drum, where the governor selectively applies a governing force to the tailgate through the rotatable drum to slow an opening speed of the tailgate.

In yet another embodiment, a tailgate energy management system for controlling an opening speed of a tailgate relative to sidewalls of a vehicle includes a governor coupled to one of the sidewalls and to the tailgate, where the governor selectively applies a governing force to the tailgate that reduce the opening speed of the tailgate. The tailgate energy management system also includes a speed sensor sensing an opening speed of the tailgate and an electronic control unit electronically coupled to the governor and the speed sensor. The electronic control unit includes a processor and memory storing a computer readable and executable instruction set. The electronic control unit receives a speed signal indicative of the opening speed of the tailgate from the speed sensor and the processor executes the instruction set to cause the electronic control unit to transmit a control signal to the governor such that the governor slows the opening speed of the tailgate based on the speed signal.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
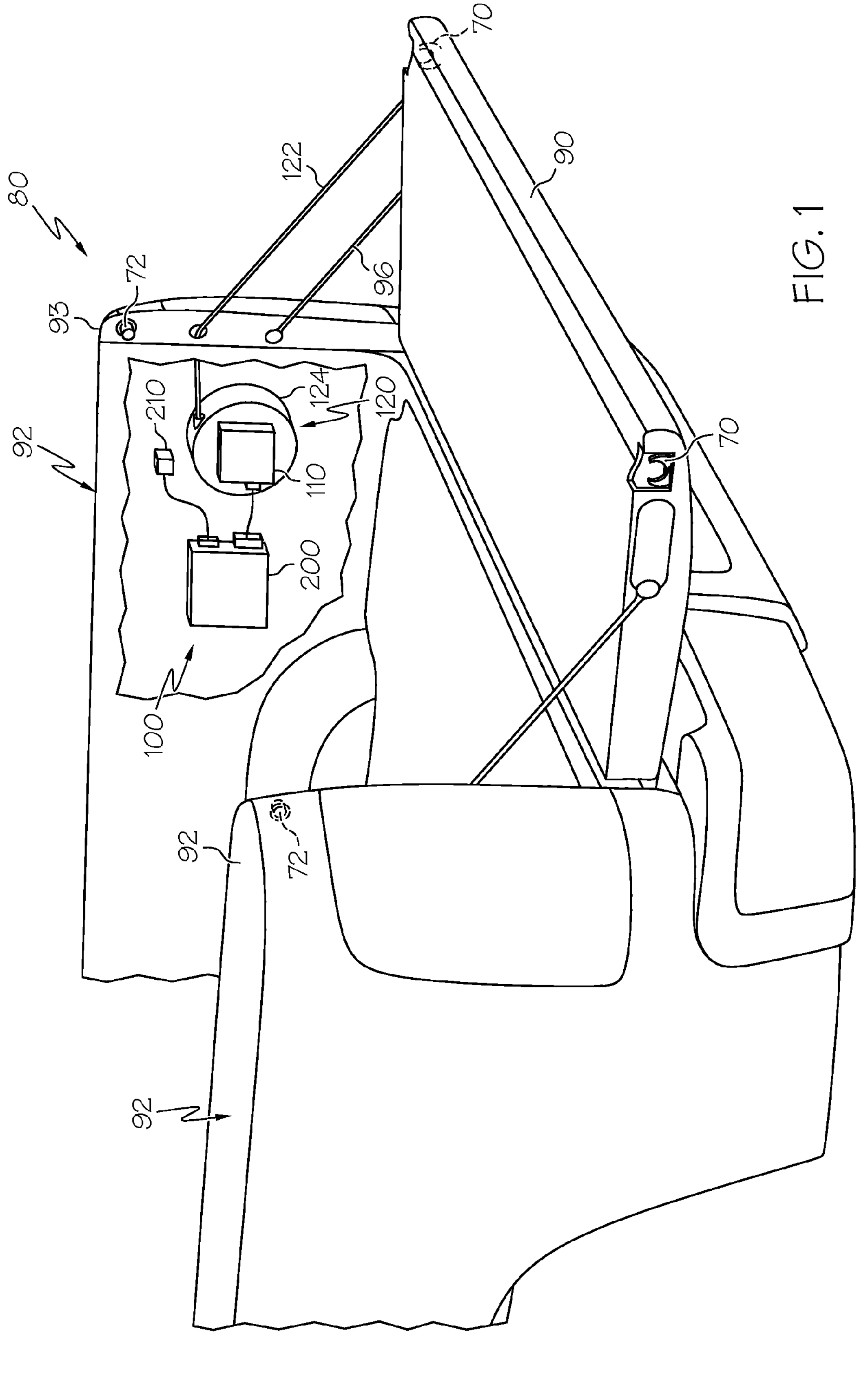
FIG. 1 depicts a perspective view of a vehicle including a tailgate energy management system according to one or more embodiments shown and described herein.

Embodiments described herein relate to vehicles having tailgate energy management systems that limit the opening energy of the tailgates. Referring to FIG. 1, one embodiment of a vehicle with a tailgate energy management system is schematically depicted. The vehicle includes a tailgate located proximate to the rear ends of the sidewalls of the vehicle. A governor is coupled to one of the sidewalls and to the tailgate. An electronic control unit works in conjunction with the governor to selectively apply a governing force to the tailgate. The governing force reduces the opening speed of the tailgate. The electronic control unit receives a speed signal from a speed sensor that indicates the opening speed of the tailgate. The electronic control unit transmits a control signal to the governor causing the governor to apply the governing force to the tailgate based on the speed signal. Embodiments of the tailgate energy management system and vehicles incorporating the same will be described in more detail herein.

Referring now to FIG. 1, one embodiment of a vehicle 80 including a tailgate energy management system 100 is shown. The vehicle 80 includes two sidewalls 92 spaced laterally apart from one another. A tailgate 90, illustrated in an open position, is located proximate to the rear ends 93 of the sidewalls 92. The tailgate energy management system 100 includes a governor 110 coupled to one of the sidewalls 92 of the vehicle 80. The tailgate energy management system 100 also includes an electronic control unit 200 electronically coupled to the governor 110 and to a speed sensor 210. The speed sensor 210 transmits a speed signal that is received by the electronic control unit 200. The speed signal corresponds to the opening speed of the tailgate 90. The speed sensor 210 may be a Hall Effect sensor or a similar sensor for determining the rotational speed of a component. The speed sensor 210 may determine the rotational rate of the retractable cable assembly 120 or the linear speed of travel of the cable 122 coupled to the tailgate 90.

As used herein, governor 110 is a clutch assembly or a brake assembly that applies a force to a proximate component of the tailgate energy management system 100 to slow or stop the movement of the proximate component. In the embodiment described herein, the governor 110 is electronically actuated by a control signal transmitted from the electronic control unit 200 and received by the governor 110. When the governor 110 receives the control signal from the electronic control unit 200, the governor 110 applies a force to the proximate component of the tailgate energy management system 100 such that the force reduces the opening speed of the tailgate 90. An example of such an electronically actuated governor 110 is an electromagnetic clutch or electromagnetic brake available from Ogura Industrial Corp. of Somerset, N.J. In the alternative, the governor 110 may be mechanically controlled and actuated. Examples of such a mechanically controlled and actuated governor 110 may include a centrifugal clutch or brake that engages a proximate component of the tailgate energy management system 100 when the speed of rotation of the centrifugal clutch or brake exceeds a threshold speed.

Figure 7:
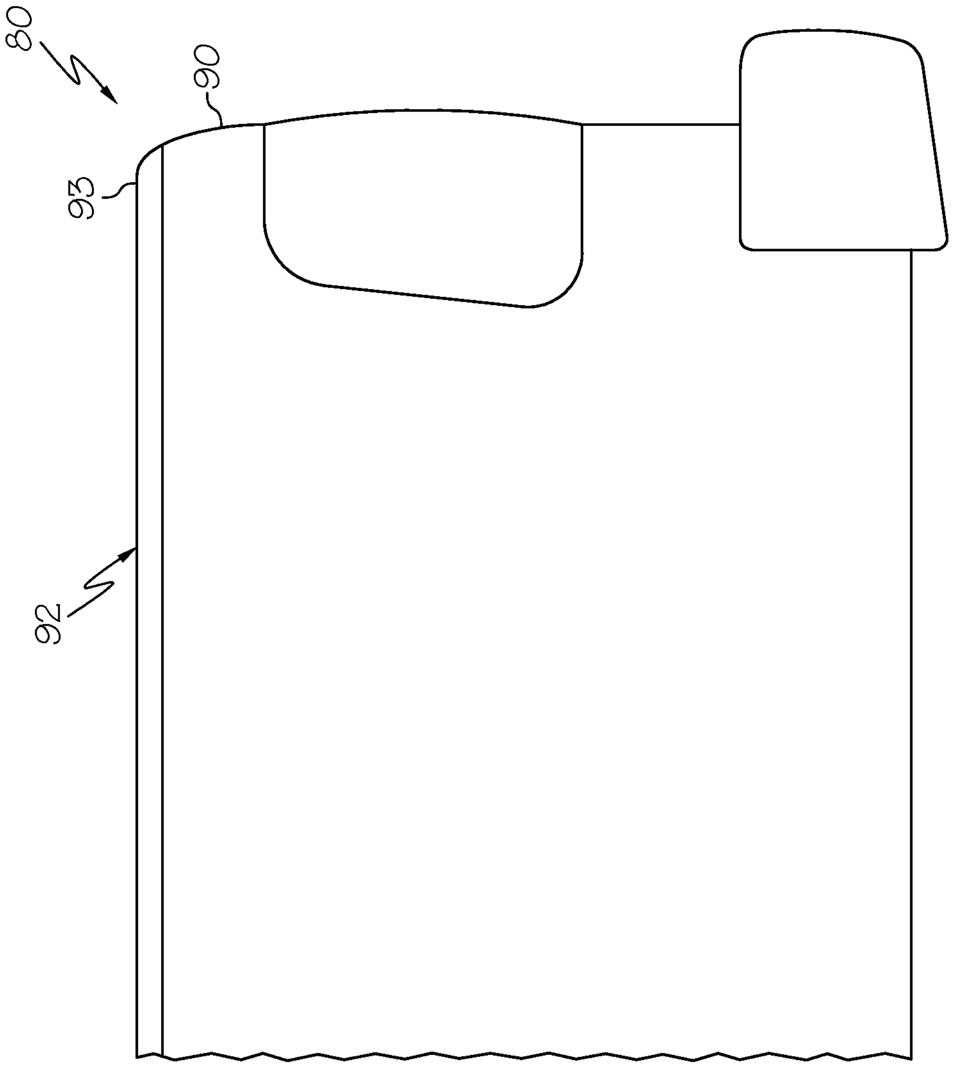
FIG. 7 depicts a side view of a vehicle including a tailgate energy management system according to one or more embodiments shown and described herein.

In the embodiment depicted in FIG. 1, the tailgate energy management system 100 further includes a retractable cable assembly 120 that includes a cable 122 and a rotatable drum 124. The cable 122 is coupled to the tailgate 90 and is wound about the rotatable drum 124. The rotatable drum 124 pays out the cable 122 as the tailgate 90 rotates from a closed position (as depicted in FIG. 7) to an open position (as depicted in FIG. 1). Additionally, the rotatable drum 124 collects the cable 122 and winds the cable 122 about the rotatable drum 124 as the tailgate 90 rotates from an open position to a closed position.

The vehicle 80 may also include an over-travel cable 96 coupled to both the sidewall 92 and to the tailgate 90. The over-travel cable 96 supports the tailgate 90 when the tailgate 90 is in the open position and stops the tailgate 90 from rotating. As shown in FIG. 1, the over-travel cable 96 stops the tailgate 90 from rotating and holds the tailgate 90 in an approximately horizontal orientation.

The vehicle 80 also includes at least one tailgate latch 70 and a corresponding tailgate latch striker 72. The vehicle 80 depicted in FIG. 1 includes two tailgate latches 70 positioned along opposite sides of the tailgate 90 proximate to each of the sidewalls 92. When the tailgate 90 is located in the closed position, the tailgate latches 70 interface with the tailgate latch striker 72, thereby securing the tailgate 90 to the sidewalls 92 of the vehicle 80 and maintaining the tailgate 90 in a closed position. The tailgate latches 70 and the tailgate latch strikers 72 maintain the tailgate 90 in the closed position until the tailgate latches 70 are actuated to decouple from one another. While the embodiment of FIG. 1 depicts the tailgate latch 70 as being positioned along the tailgate 90 and the tailgate latch strikers 70 positioned along the sidewalls 92 of the vehicle 80, it should be understood that the relative positions of the tailgate latches 70 and the tailgate latch strikers 72 with respect to the tailgate 90 and the sidewalls 92 of the vehicle 80 may be modified without departing from the scope of this disclosure.

Figure 8:
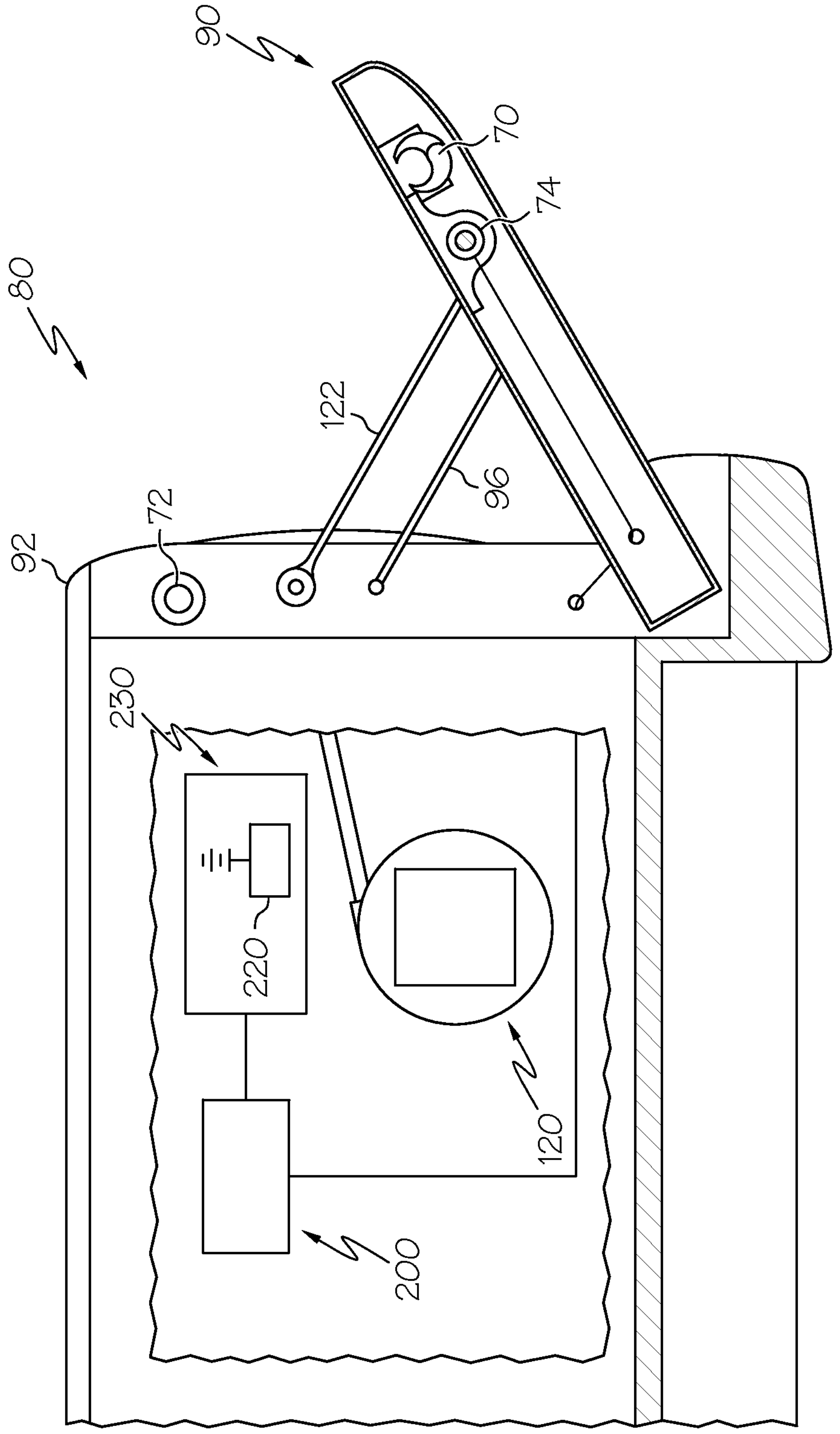
FIG. 8 depicts a cut-away side view of a vehicle including a tailgate energy management system according to one or more embodiments shown and described herein.

Referring to FIG. 8, the tailgate latches 70 are actuated to release themselves from the tailgate latch strikers 72, thereby releasing the tailgate 90 from the closed position relative to the sidewalls 92 of the vehicle 80. The tailgate latches 70 may be actuated by a variety of methods including, for example and without limitation, manual actuation of a remotely-located latch release or automated actuation, for example actuated by a tailgate latch actuator 74. In the embodiment depicted in FIG. 8, the tailgate latch actuator 74 is a linearly-acting actuator, however, other embodiments of tailgate latch actuators are contemplated including rotary-acting actuators. In some embodiments, the tailgate latch actuator 74 may be coupled to the latch 70 through a force transmission mechanism (not shown), for example a Bowden cable or a linkage, thereby allowing the tailgate latch actuator 74 to be position and oriented at various locations within the vehicle 80 while continuing to provide force to actuate the tailgate latch 70. In some embodiments, a single tailgate latch actuator 74 may be coupled to tailgate latches 70 positioned along opposite sides of the tailgate 90 (as depicted in FIG. 1), such that the single tailgate latch actuator 74 actuates both tailgate latches 70.

As conventionally known, the tailgate latch 70 includes an internal resistance that prevents the tailgate latch 70 from spontaneously opening, thereby allowing the tailgate latch 70 from becoming disengaged from the tailgate latch striker 72 unless so actuated. To release the tailgate 90 from the closed position relative to the sidewalls 92 of the vehicle 80, the tailgate latches 70 are selectively unlatched from the tailgate latch strikers 72, thereby decoupling the tailgate latches 70 from the tailgate latch strikers 72. The tailgate latch actuator 74 applies an unlatching force to the tailgate latch 70 as to disengage the tailgate latch 70 from the tailgate latch striker 72. The unlatching force is greater than the internal resistance of the tailgate latch 70 such that the unlatching force overcomes the internal resistance of the tailgate latch 70.

In some embodiments, the kinetic energy that the tailgate 90 opens with may be increased with the addition of an external force and/or mass applied to the tailgate 90 in a direction that the tailgate 90 opens from the sidewalls 92 of the vehicle 80. In one example, such external load may be applied to the tailgate 90 by cargo positioned within the bed of the vehicle 80. As discussed hereinabove, the tailgate energy management system 100 mitigates the kinetic energy with which the tailgate 90 opens. Increasing the kinetic energy of the tailgate 90 through the addition of an external force and/or mass may be undesired. Further, the increase in kinetic energy of the tailgate 90 through the addition of external force and/or mass may reduce the effectively of the components of the tailgate energy management system 100 such that the tailgate energy management system cannot reduce the kinetic energy of the tailgate 90 to a desired level. Accordingly, components that prevent the tailgate 90 from opening when an external load and/or mass is applied to the tailgate 90 may be desired.

In some embodiments of the tailgate latch 70, the internal resistance of the tailgate latch 70 may increase when an external force and/or mass is applied to the tailgate 90. The external force and/or mass applied to the tailgate 90 is reacted through the tailgate latch 70 and the tailgate latch striker 72, thereby increasing the force applied by the tailgate latch 70 onto the tailgate latch striker 72 in the opening direction of the tailgate 90. This increase in force between the tailgate latch 70 and the tailgate latch striker 72 may increase the internal resistance of the tailgate latch 70. An increase in the internal resistance of the tailgate latch 70 may require that the tailgate latch actuator 74 applies an increased latch actuation force to release the tailgate latch 70 from the tailgate latch striker 72. To prevent opening of the tailgate 90 when an external force and/or mass is applied to the tailgate 90 that exceeds a predetermined maximum external load applied to the tailgate 90, the maximum latch actuation force of the tailgate latch actuator 74 may be actively or passively controlled such that the tailgate latch actuator 74 provides an unlatch force capable of unlatching the tailgate latch 70 from the tailgate latch striker 72 when no external force and/or mass is applied to the tailgate 90 and is not capable of unlatching the tailgate latch 70 from the tailgate latch striker 72 when an external force and/or mass is applied to the tailgate 90.

In some embodiments, an end-user of the vehicle 80 may provide a command to command device 230 to open the tailgate 90. In some embodiments, the command device 230 may be incorporated into the electronic control unit 200. In other embodiments, the command device 230 may be incorporated into a secondary electronic control module (not shown). In still other embodiments, the command device 230 may be a relay, which may be communicatively isolated from the electronic control unit 200. In some embodiments, the end-user may provide the command to open the tailgate 90 by toggling a switch (not shown), for example, a vehicle body or cabin-mounted switch, that is communicatively coupled to the command device 230. In other embodiments, the end-user may provide the command to open the tailgate 90 by depressing a button on a radio transmitting device (not shown). The radio transmitting device provides a wireless signal, which is received by a wireless receiver 220 that is communicatively coupled to the command device 230.

After receiving the command to open the tailgate 90 from the end-user, the command device 230 may provide an unlatch signal to the tailgate latch actuator 74, thereby commanding the tailgate latch actuator 74 to apply the unlatch force to the tailgate latch 70 as to unlatch the tailgate latch 70 from the tailgate latch striker 72. As described hereinabove, the tailgate latch actuator 74 provides an unlatch force to the tailgate latch 70 that is smaller than a predetermined maximum unlatch force. By applying an unlatch force that is less than the predetermined maximum unlatch force, the tailgate latch actuator 74 unlatches the tailgate latch 70 from the tailgate latch striker 72 when external force and/or mass is applied to the tailgate 90 is less than a predetermined maximum external load, and does not unlatch the tailgate latch 70 from the tailgate latch striker 72 when external force and/or mass is applied to the tailgate 90 exceeds a predetermined maximum external load.

The unlatch signal provided to the tailgate latch actuator 74 by the command device 230 may be terminated if an external force and/or mass is applied to the tailgate 90. In some embodiments, the command device 230 may provide the unlatch signal to the tailgate latch actuator 74 and subsequently terminate the unlatch signal to the tailgate latch actuator 74, such that if the unlatch force applied to the tailgate latch 70 by the tailgate latch actuator 74 does not overcome the internal resistance of the tailgate latch 70, the tailgate 90 will remain in a closed position. In other embodiments, the electronic control unit 200 may determine that the tailgate 90 has not opened following an unlatching operation by the tailgate latch actuator 74, for example by sensing no speed signal from the speed sensor 210, as depicted in FIG. 1. The electronic control unit 200 may terminate the unlatch signal to the tailgate latch actuator 74. In some embodiments, the command device 230 may be configured to "time-out" the unlatch signal as to stop transmitting the unlatch signal to the tailgate latch actuator 74 after a pre-determined time. Embodiments of the vehicle 80 incorporating the tailgate latch actuator 74 may passively manage remote actuation of the vehicle tailgate 90 by restricting remote actuation. As such, the tailgate latch actuator 74 that manages remote actuation of the vehicle tailgate 90 as to control remote actuation of the vehicle tailgate 90 may do so without the inclusion of sensors to determine if an external force and/or mass exceeding a predetermined maximum external load is applied to the vehicle tailgate 90 in the opening direction.

Figure 2:
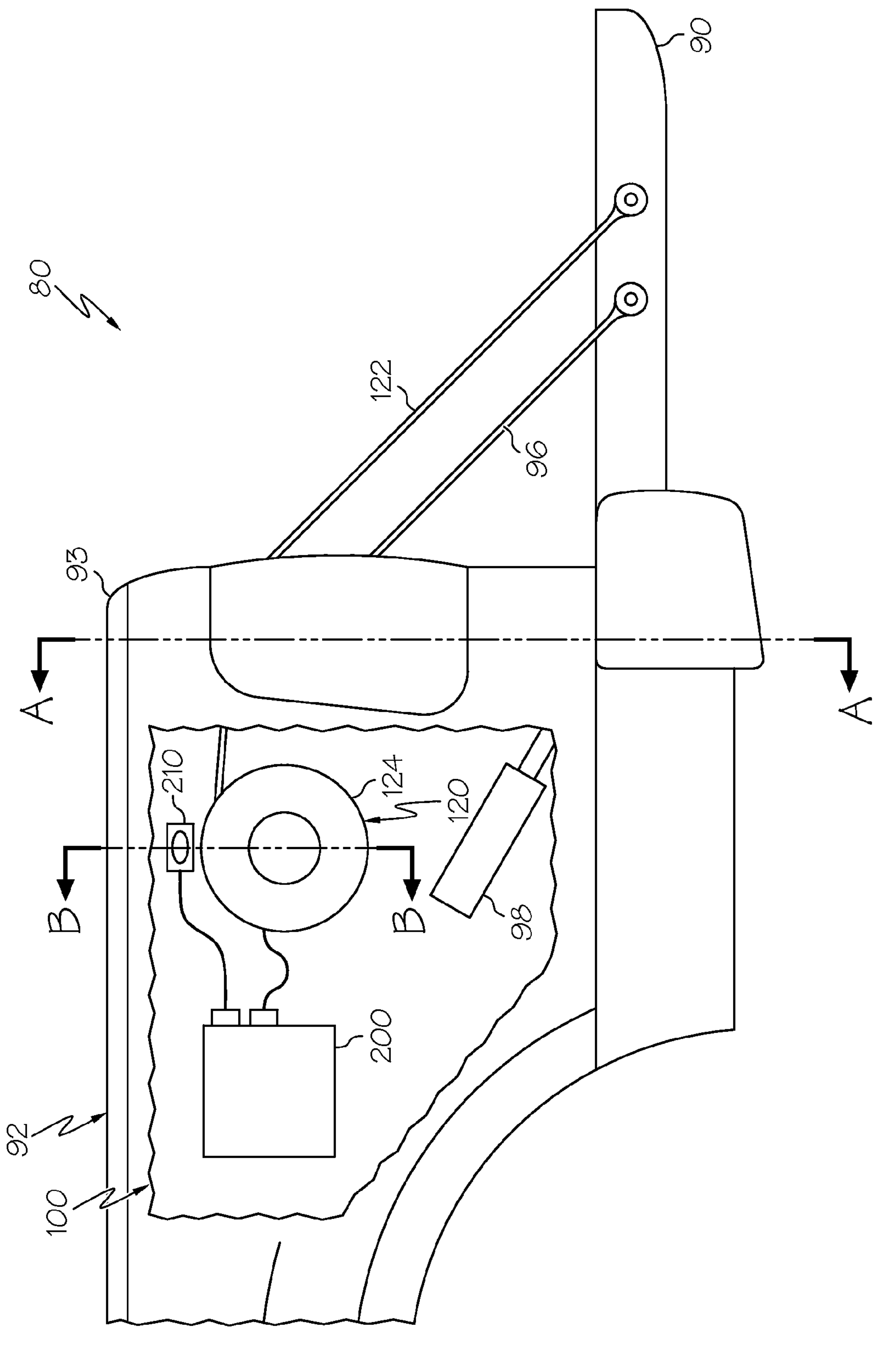
FIG. 2 depicts a cut-away side view of a vehicle including a tailgate energy management system according to one or more embodiments shown and described herein.

Referring to FIG. 2, one embodiment of the vehicle 80 may include a tailgate assist damper 98 coupled to a sidewall 92 of the vehicle 80 and to the tailgate 90. The tailgate assist damper 98 applies an assist force to the tailgate 90 in a direction that reduces the force required to be input by a user to reposition the tailgate 90 between open and closed positions. In the embodiment depicted in FIG. 2, the tailgate assist damper 98 applies a force to the tailgate 90 in a direction corresponding to rotating the tailgate 90 from an open position to a closed position. Thus, the tailgate assist damper 98 shown in FIG. 2 reduces the opening speed of the tailgate 90 and/or reduces the force required to be applied by a user to rotate the tailgate 90 to the closed position. An example of such a tailgate assist damper 98 includes the Tailgate Lift-Assist available from Multimatic Inc. of Markham, Ontario, Canada.

Figure 3:
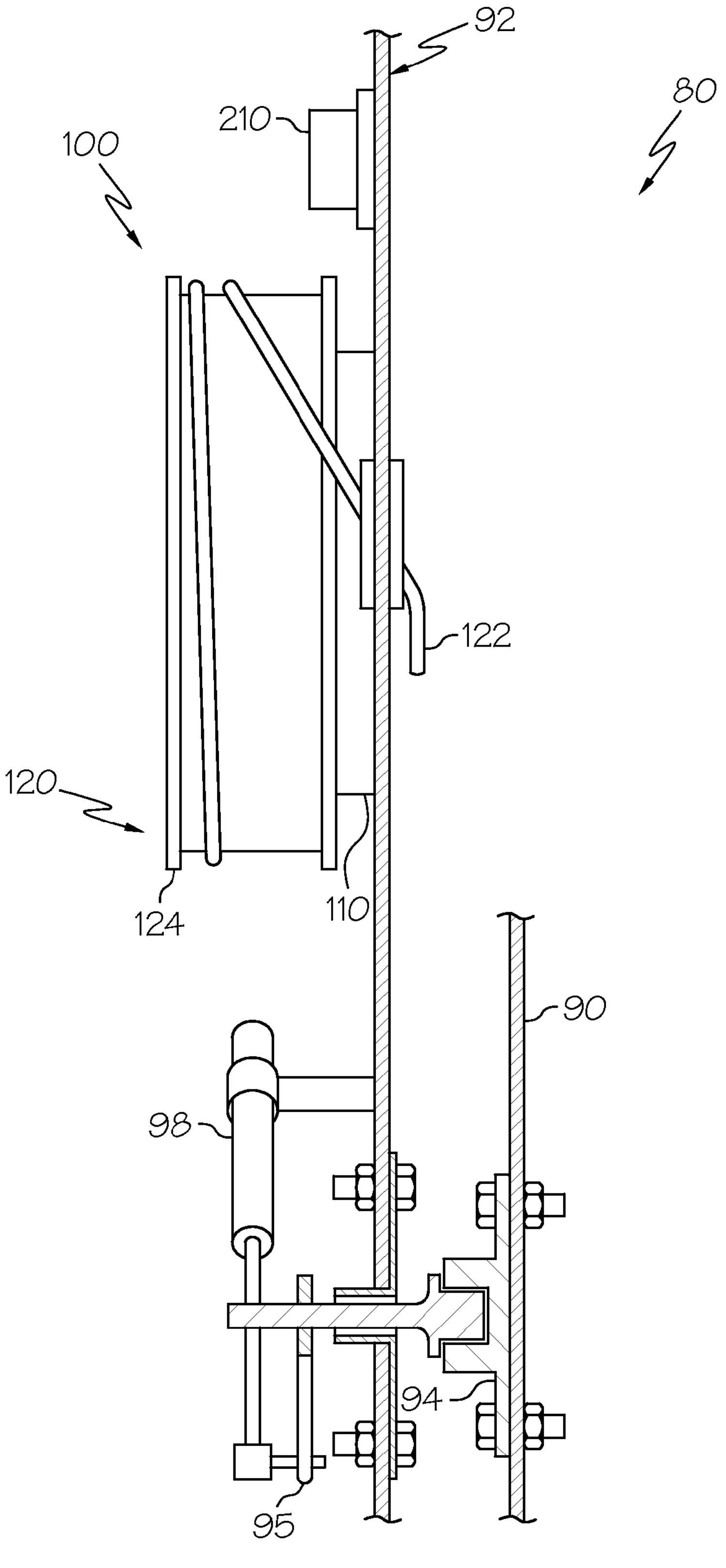
FIG. 3 depicts a rear view of the vehicle including a tailgate energy management system of FIG. 2 along line A-A.
Figure 4:
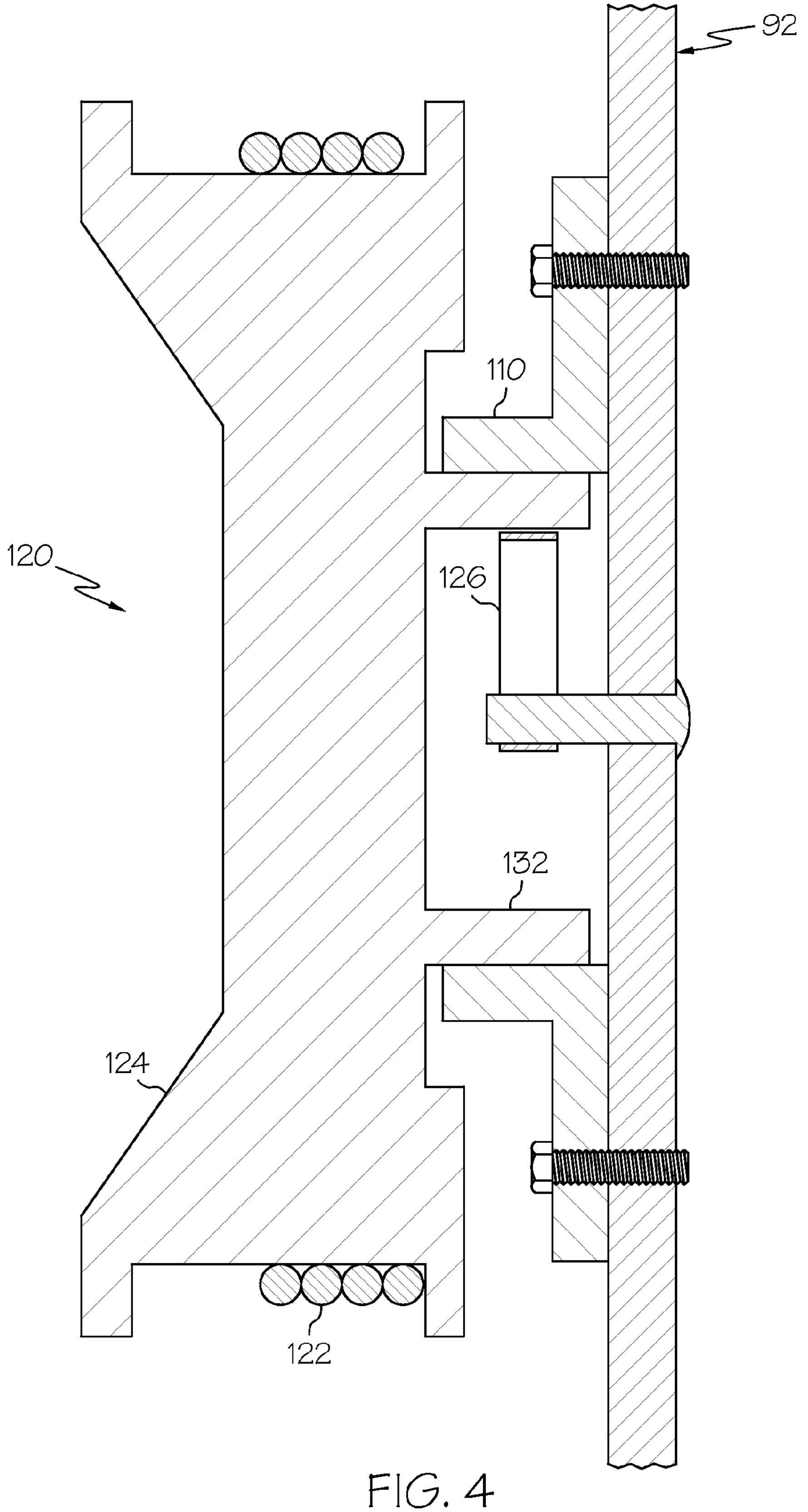
FIG. 4 depicts a rear view of the tailgate energy management system of FIG. 2 along line B-B.

Referring now to FIG. 3, components of the tailgate energy management system 100 of FIG. 2 are shown in greater detail. The tailgate assist damper 98 is coupled to the tailgate 90 through a linkage 95 that connects to a hinge 94. The linkage 95 and the hinge 94 transmit torque from the tailgate assist damper 98 to the tailgate 90. The rotatable drum 124 of the retractable cable assembly 120 is coupled to the sidewall 92 of the vehicle 80. As depicted in FIG. 3 and shown in greater detail in FIG. 4, the rotatable drum 124 is mounted to the sidewall 92 with a hub 132 that interfaces with the governor 110. When the electronic control unit 200 determines the opening speed of the tailgate 90 needs to be reduced, the governor 110 interacts with the hub 132 to apply a governing force to the rotatable drum 124, which, in turn, limits the opening speed of the tailgate 90. In some embodiments, the retractable cable assembly 120 may further include a pre-wound spring 126 that applies a coiling force to the rotatable drum 124. The coiling force is applied in a direction that assists with winding the cable 122 about the rotatable drum 124 as the tailgate 90 rotates from an open position to a closed position.

Referring now to FIGS. 2 and 3, by controlling the opening speed of the tailgate 90, the tailgate energy management system 100 controls a maximum amount of kinetic energy that the tailgate 90 carries as the tailgate 90 rotates from a closed position to an open position. By limiting the amount of kinetic energy carried by the tailgate 90 as it opens, damage to the tailgate 90 and/or a surrounding object may be minimized if the tailgate 90 contacts the surrounding object while opening.

Specifically, as the tailgate 90 rotates to an open position, the tailgate assist damper 98 applies torque to the tailgate 90 that decreases the opening speed of the tailgate 90. Simultaneously, the cable 122 begins to pay out from the rotatable drum 124. The speed sensor 210 senses that the cable 122 is being paid out and transmits a speed signal to the electronic control unit 200 indicative of the opening speed of the tailgate 90. In the embodiment depicted in FIGS. 2 and 3, the speed sensor 210 measures the speed of rotation of the rotatable drum 124. Because the rotatable drum 124 pays out the cable 122 coupled to the tailgate 90, the speed of rotation of the rotatable drum 124 corresponds to the opening speed of the tailgate 90.

The electronic control unit 200 receives the speed signal from the speed sensor 210. A processor in the electronic control unit 200 processes the speed signal from the speed sensor 210, and, based on a computer readable and executable instruction set stored in memory, determines if the opening speed of the tailgate 90 is approaching a pre-determined maximum opening speed. The pre-determined maximum opening speed of the tailgate 90 may be calculated and stored in the memory of the electronic control unit 200. The maximum opening speed may be determined such that the kinetic energy of the tailgate 90 does not exceed a certain threshold of kinetic energy, for example about 10 joules. The opening speed of the tailgate 90 and the weight of the tailgate 90 determine the kinetic energy of the tailgate 90 as the tailgate 90 rotates to the open position.

The electronic control unit 200 compares the speed signal received from the speed sensor 210 to a stored value to determine whether the opening speed of the tailgate 90 is approaching or exceeds the pre-determined maximum opening speed. In some embodiments, the electronic control unit 200 may include a control variable that is stored in memory of the electronic control unit 200. The instruction set of the electronic control unit 200 instruct the processor to compare the speed signal that is received from the speed sensor 210 to the control variable stored in memory. In other embodiments, the electronic control unit 200 may include a lookup table stored in memory that correlates the speed signal transmitted by the speed sensor 210 to an opening speed of the tailgate 90. In yet other embodiments, the instruction set may include a conversion variable that correlates the speed signal transmitted by the speed sensor 210 to an opening speed of the tailgate 90. Thus, the electronic control unit 200 determines if the opening speed of the tailgate 90 is approaching a pre-determined maximum opening speed by comparing the speed signal transmitted by the speed sensor 210 to a stored value stored within the electronic control unit 200.

In the embodiment of vehicles 80 where the speed sensor 210 uses a Hall Effect sensor, the electronic control unit 200 may evaluate the time intervals between voltage peaks that are induced into the speed sensor 210 by rotating permanent magnets coupled to the retractable cable assembly 120. The time intervals between voltage peaks measured by the Hall Effect sensor correspond to the speed of rotation of the permanent magnets and, in turn, the opening speed of the tailgate 90. In addition, the electronic control unit 200 may evaluate the speed signal that is received from the speed sensor 210 to calculate the angular opening speed of the tailgate 90.

As the opening speed of the tailgate 90 approaches the maximum opening speed, the electronic control unit 200 processes the speed signal from the speed sensor 210 based on the instruction set and determines that the tailgate 90 is approaching the pre-determined maximum opening speed. The electronic control unit 200 transmits a control signal to the governor 110 to actuate the governor 110. The governor 110 receives the control signal from the electronic control unit 200 and, in turn, applies a governing force to the tailgate 90. The governing force slows the opening speed of the tailgate 90. In the embodiment depicted in FIGS. 2 and 3, the governor 110 is coupled to the rotatable drum 124 by the hub 132. The governor 110, therefore, applies the governing force to hub 132 such that the speed of rotation of the rotatable drum 124, and the corresponding speed that the rotatable drum 124 pays out the cable 122, is limited. Thus, the governor 110 slows the opening speed of the tailgate 90.

In embodiments of the vehicle 80 that include electromechanical brakes as the governor 110, the electronic control unit 200 may transmit a control signal to the governor 110 to intermittently apply and release the electromechanical brake, such that the governing force is "pulsed," thereby decreasing the opening speed of the tailgate 90.

In some embodiments, the tailgate assist damper 98 and the tailgate energy management system 100 may work in conjunction with one another to control the opening speed of the tailgate 90. In general, tailgate assist dampers 98 provide a directional force to tailgates 90 that decreases the opening speed of the tailgate 90 and reduces the force a user must apply to rotate the tailgate 90 from an open position to a closed position. Under normal operating conditions, the tailgate assist damper 98 may control the opening speed of the tailgate 90 without exceeding a predetermined maximum opening speed. However, under certain operating conditions, for example, with the vehicle 80 parked on an incline, at elevated temperatures, and/or with a worn tailgate assist damper 98, the tailgate 90 may be prone to open at speeds that exceed the pre-determined maximum opening speed. Under conditions such as these, the tailgate energy management system 100 and the tailgate assist damper 98 operate in conjunction with one another to control the opening speed of the tailgate 90 such that the tailgate 90 opens without intervention from a user, and opens without exceeding the pre-determined maximum opening speed.

Conversely, under certain operating conditions, for example, with the vehicle 80 parked on an incline, the tailgate 90 may be prone to open at a speed that does not exceed the maximum opening speed. Under such conditions, the tailgate assist damper 98 will apply torque to the tailgate 90 that prevents the tailgate 90 from opening at a speed greater than the maximum opening speed. In these conditions, the speed sensor 210 continues to transmit a speed signal to the electronic control unit 200. The electronic control unit 200 calculates that the opening speed of the tailgate 90 and determines that the opening speed of the tailgate 90 is not approaching the pre-determined maximum opening speed. Because no governing force is required to slow the opening speed of the tailgate 90 below the pre-determined maximum opening speed, the electronic control unit 200 does not transmit a control signal to the governor 110 to actuate the governor 110. Thus, the tailgate energy management system 100 does not apply a governing force to the tailgate 90 to reduce the opening speed of the tailgate 90.

Alternatively, or in addition to the tailgate assist damper 98, the vehicle 80 may include torsion springs (not shown) that apply a direction force to the tailgate 90. The directional force applied by the torsion springs is applied to the tailgate 90 is a direction that decreases the opening speed of the tailgate 90 and reduces the force a user must apply to rotate the tailgate 90 from an open position to a closed position.

Figure 5:
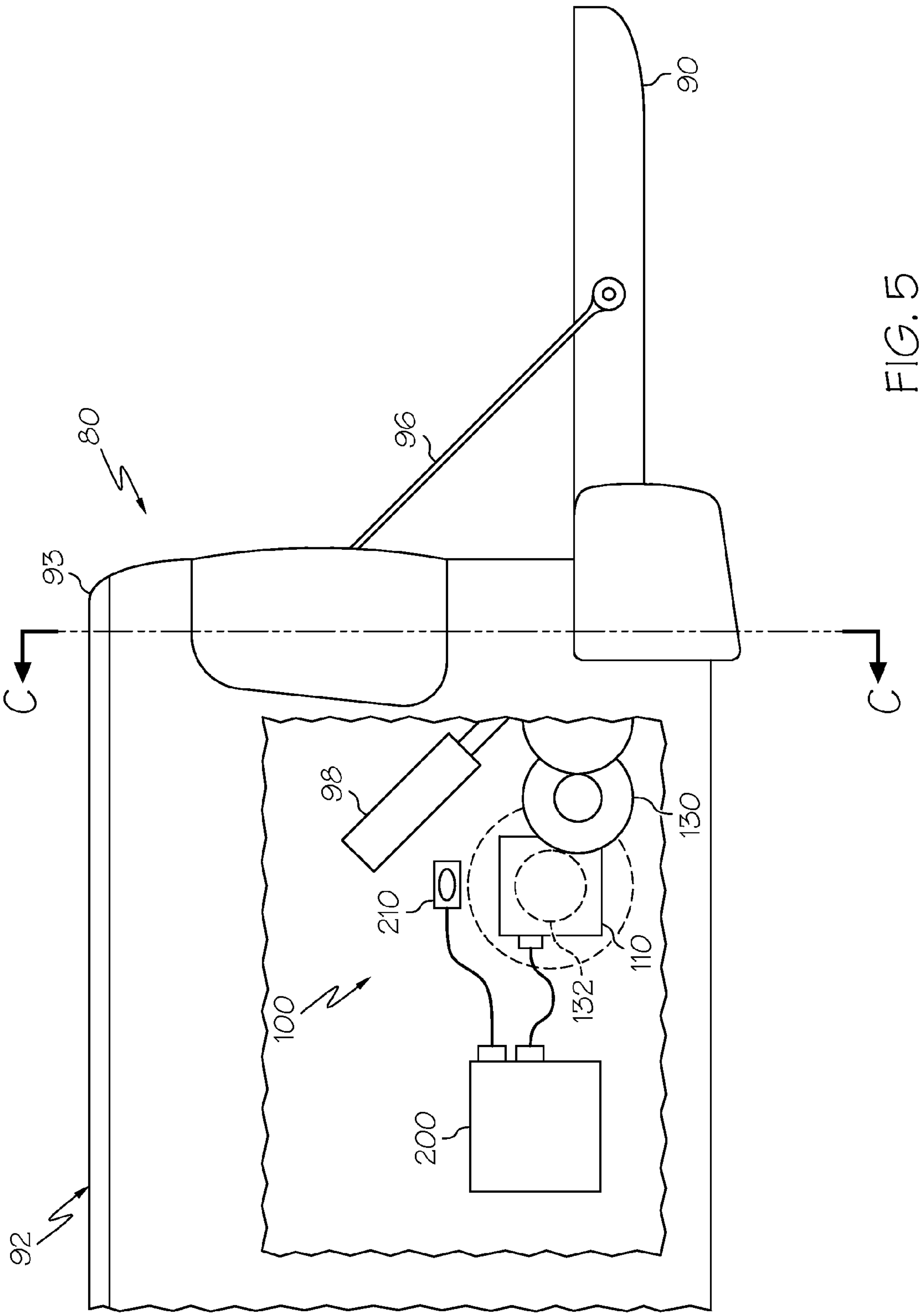
FIG. 5 depicts a cut-away side view of a vehicle including a tailgate energy management system according to one or more embodiments shown and described herein.
Figure 6:
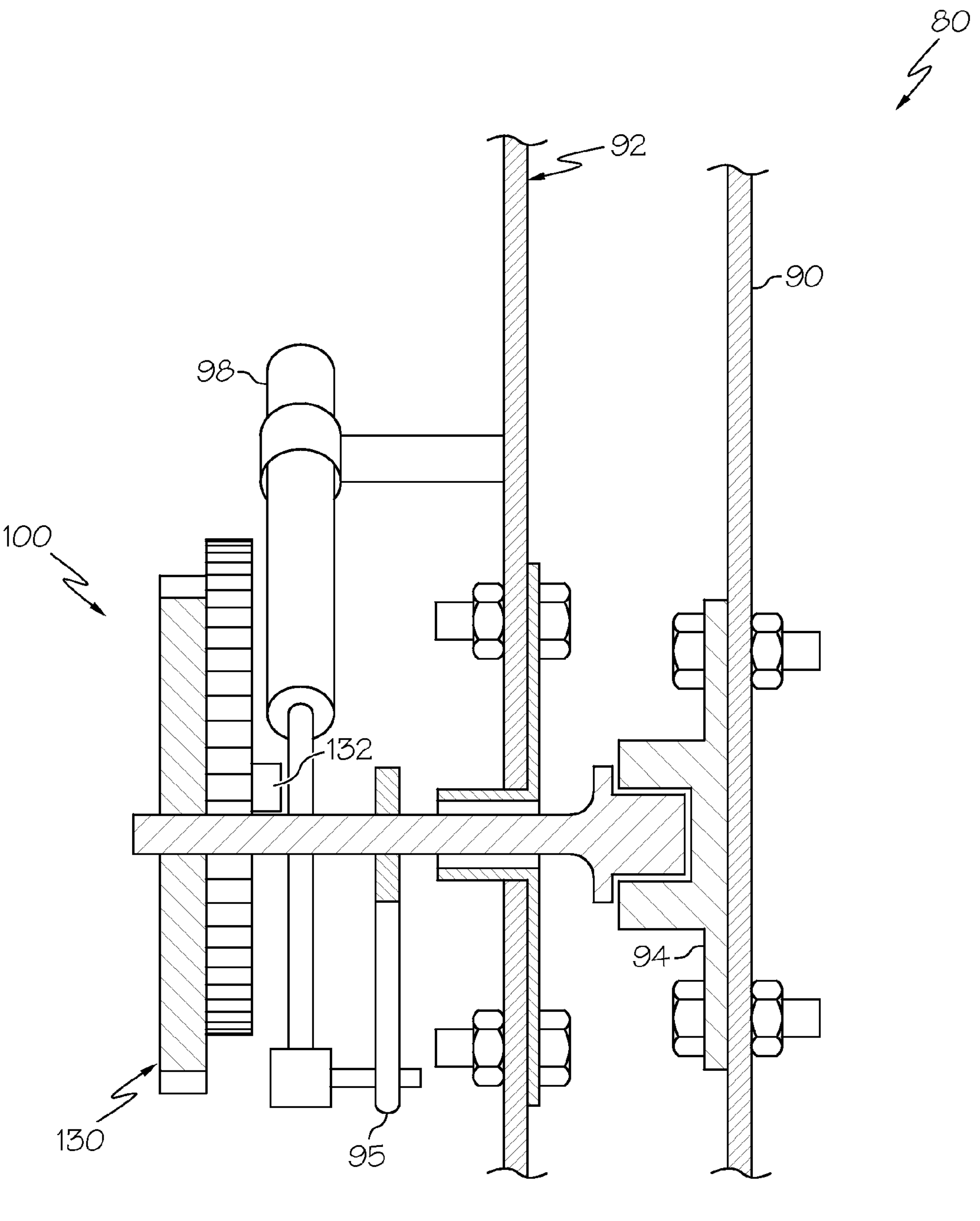
FIG. 6 depicts a rear view of the vehicle including a tailgate energy management system of FIG. 5 along line C-C.

Another embodiment of a vehicle 80 including a tailgate energy management system 100 is depicted in FIGS. 5 and 6. In this embodiment, the tailgate energy management system 100 includes a hub 132 located within one of the sidewalls 92 of the vehicle 80. In the depicted embodiment, the hub 132 is coupled to the tailgate 90 with a reduction gear set 130, a linkage 95, and a hinge 94. The hub 132 is coupled to the governor 110, allowing the governor 110 to apply the governing force to the tailgate 90 by applying the governing force directly to the hub 132.

Similar to the embodiment described with reference to FIGS. 2 and 3 above, the tailgate energy management system 100 depicted in FIGS. 5 and 6 controls a maximum amount of kinetic energy that may be carried by the tailgate 90 as the tailgate 90 rotates from a closed position to an open position. The speed sensor 210 transmits a speed signal indicative of the opening speed of the tailgate 90 to the electronic control unit 200. In the embodiment depicted in FIGS. 5 and 6, the speed sensor 210 measures the speed of rotation of one of the members of the reduction gear set 130. Because the reduction gear set 130 is coupled to the tailgate 90 by the linkage 95 and the hinge 94, the speed of rotation of the members of the reduction gear set 130 corresponds to the opening speed of the tailgate 90.

The electronic control unit 200 receives the speed signal from the speed sensor 210. The electronic control unit 200 evaluates the speed signal from the speed sensor 210 to determine if the opening speed of the tailgate 90 is approaching a pre-determined maximum opening speed. As the opening speed of the tailgate 90 approaches the maximum opening speed, the electronic control unit 200 transmits a control signal to the governor 110 to actuate. The governor 110 receives the control signal from the electronic control unit 200 and applies a governing force to the tailgate 90. The governing force slows the opening speed of the tailgate 90. In the embodiment depicted in FIGS. 5 and 6, the governor 110 applies the governing force to the hub 132, such that the speed of rotation of the hub 132, and the corresponding speeds of the reduction gear set 130, are limited. Thus, the governor 110 slows the opening speed of the tailgate 90.

Vehicles 80 that include tailgate energy management systems 100 as described herein may be included with other components that allow the tailgate 90 to be actuated by a user while the user is positioned at a location remote from the tailgate 90 and/or the vehicle 80. An example of such an application is a vehicle 80 that includes a remote keyless entry system that allows a user to trigger operation of tailgate 90. A vehicle 80 having a remote keyless entry system may allow the user to remotely rotate the tailgate 90 from a closed position to an open position. By limiting the maximum kinetic energy that the tailgate 90 may carry as it opens, the tailgate energy management system 100 may reduce the likelihood of damage due to contact of the tailgate 90 with any surrounding object as the tailgate 90 is remotely opened.

Vehicles 80 that include remote keyless entry systems and tailgate energy management systems 100 as described hereinabove may include control logic that disables the remote keyless entry system in the event that the tailgate energy management system 100 is not reducing the opening speed of the tailgate 90. In one embodiment, the control logic may transmit a command to disable the remote keyless entry system from performing subsequent opening operations if the electronic control unit 200 determines that the opening speed of the tailgate 90 exceeds the maximum opening speed.

Additionally, as a user may remove and reattach the tailgate 90 from the vehicle 80, the user may reattach the tailgate 90 to the vehicle 80 without properly connecting the tailgate energy management system 100 to the tailgate 90. The electronic control unit 200 may include control logic stored in memory that evaluates the opening speed of the tailgate 90. If the tailgate energy management system 100 is not properly connected to the tailgate 90, the speed sensor 210 may not measure an opening speed of the tailgate 90 after the tailgate 90 has been triggered to open by the remote keyless entry system. In the event no opening speed is measured but an opening operation has been triggered by the remote keyless entry system, the electronic control unit 200 may disable the remote keyless entry system from triggering subsequent opening operations.

Alternatively, or in addition, in vehicles 80 that include the tailgate energy management system 100 as depicted in FIGS. 2 and 3, the electronic control unit 200 may be connected to a retraction sensor (not shown) that evaluates whether any cable 122 is paid out from the rotatable drum 124. In general, when connecting the cable 122 to the tailgate 90, cable 122 may be paid out from the rotatable drum 124. Thus, if the retraction sensor senses that no cable 122 is paid out (i.e., the cable 122 is fully wound along the rotatable drum 124), the electronic control unit 200 may disable the remote keyless entry system from triggering an opening operation.

Vehicles 80 may also include a tailgate position sensor (not shown) that senses if the tailgate 90 is located in a closed position and transmits a tailgate position signal to the electronic control unit 200. If the electronic control unit 200 determines that the tailgate 90 is located in an open position, the electronic control unit 200 may disable the remote keyless entry system from triggering an opening operation.

Vehicles 80 that include tailgate energy management systems 100 according to the present disclosure allow a user to manually rotate the tailgate 90 between open and closed positions without requiring operation of the tailgate energy management systems 100, such as when the kinetic energy of the tailgate 90 does not exceed the threshold energy as the user manually rotates the tailgate 90 between open and closed positions. Thus, a user may manually open the tailgate 90 of the vehicle 80 without having to disconnect the tailgate energy management system 100 from the tailgate 90. Additionally, the tailgate energy management system 100 may not add significant resistance to rotating the tailgate 90 to the closed position from the open position. Thus, closing the tailgate 90 by the user may not be more difficult as compared to a vehicle 80 that does not include a tailgate energy management system 100.

It should now be understood that vehicles having tailgates may include tailgate energy management systems that limit the opening speed of the tailgates. By limiting the opening speed of the tailgates, the amount of energy the tailgates carry as they open may be controlled such that the tailgates cannot impart significant force on surrounding objects. The tailgate energy management systems apply governing forces to the tailgates that control opening speed of the tailgates while allowing a user to manually open and close the tailgate of the vehicle. The tailgate energy management systems may work in conjunction with tailgate assist dampers, which assist both with opening and closing tailgates.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of managing remote actuation of a vehicle tailgate comprising:

receiving a command to open the tailgate;

transmitting an unlatch signal to at least one tailgate latch actuator to unlatch a tailgate latch from a corresponding tailgate latch striker;

applying an unlatch force to the tailgate latch that is smaller than a predetermined maximum unlatch force; and terminating the unlatch signal to the at least one tailgate latch actuator if an external load applied to the tailgate is greater than a predetermined maximum external load.

2. The method of managing remote actuation of the vehicle tailgate of claim 1, wherein the at least one tailgate latch actuator applies an unlatch force to the tailgate latch.

3. The method of managing remote actuation of the vehicle tailgate of claim 2, wherein the unlatch force applied by the at least one tailgate latch actuator to the tailgate latch is greater than an internal resistance of the tailgate latch when the external load applied to the tailgate is smaller than the predetermined maximum external load.

4. The method of managing remote actuation of the vehicle tailgate of claim 1, wherein the external load applied to the tailgate increases an internal resistance of the tailgate latch.

5. The method of managing remote actuation of the vehicle tailgate of claim 4, wherein the unlatch force applied by the at least one tailgate latch actuator to the latch is greater than the internal resistance of the tailgate latch when the external load applied to the tailgate is less than the predetermined maximum external load.

6. The method of managing remote actuation of the vehicle tailgate of claim 5, wherein the unlatch force applied by the at least one tailgate latch actuator is less than the internal resistance of the tailgate latch when the external load applied to the tailgate is greater than the maximum external load.

7. A vehicle comprising:

a tailgate latch coupled to one of a vehicle tailgate or sidewalls of a vehicle;

a tailgate latch striker coupled to one of the vehicle tailgate or sidewalls of the vehicle, the tailgate latch and the tailgate latch striker positioned to selectively latch with one another;

a tailgate latch actuator coupled to the tailgate latch that selectively applies an unlatch force to the tailgate latch, the unlatch force being smaller than a predetermined maximum latch force that corresponds to a predetermined maximum external load applied to the tailgate, wherein if an external load applied to the tailgate is greater than the predetermined maximum external load, the tailgate latch remains latched to the tailgate latch striker; and a command device communicatively coupled to the tailgate latch actuator, the command device configured to provide an unlatch signal to the tailgate latch actuator.

8. The vehicle of claim 7, further comprising an electronic control unit communicatively coupled to the tailgate latch actuator, the electronic control unit comprising a processor and a memory storing a computer readable instruction set that, when executed by the processor, receives the unlatch signal from the command device and transmits a signal to the tailgate latch actuator to apply the unlatch force to the tailgate latch.

9. The vehicle of claim 8 further comprising a governor coupled to one of the sidewalls and to the tailgate, the governor selectively applying a governing force to the tailgate to reduce an opening speed of the tailgate.

10. The vehicle of claim 9 further comprising a speed sensor communicatively coupled to the electronic control unit sensing the opening speed of the tailgate, wherein the electronic control unit receives a speed signal indicative of the opening speed of the tailgate from the speed sensor and the processor executes the instruction set to cause the electronic control unit to transmit a control signal to the governor such that the governor slows the opening speed of the tailgate based on the speed signal.

11. The vehicle of claim 7, wherein the command device comprises a wireless receiver communicatively coupled to the electronic control unit, the wireless receiver receives a wireless command signal to open the tailgate, the wireless receiver relays the wireless command signal to the tailgate latch actuator to command the tailgate latch actuator to apply the unlatch force to the tailgate latch.

12. A method of managing remote actuation of a vehicle tailgate comprising:

receiving a command to open the tailgate;

transmitting an unlatch signal to at least one tailgate latch actuator to unlatch a tailgate latch from a corresponding tailgate latch striker; and applying an unlatch force to the tailgate latch that is smaller than a predetermined maximum unlatch force that corresponds to a maximum external load applied to the tailgate, wherein when an external load applied to the tailgate exceeds the maximum external load the tailgate latch remains latched to the striker.

13. The method of managing remote actuation of the vehicle tailgate of claim 12, further comprising terminating the unlatch signal to the at least one tailgate latch actuator if the external load applied to the tailgate is greater than the maximum external load.

14. The method of managing remote actuation of the vehicle of claim 12, wherein the external load applied to the tailgate latch increases an internal resistance of the tailgate latch.

15. The method of managing remote actuation of the vehicle of claim 14, wherein the unlatch force applied by the at least one tailgate latch actuator to the tailgate latch is greater than the internal resistance of the tailgate latch when the external load applied to the tailgate is less than the maximum external load.

16. The method of managing remote actuation of the vehicle of claim 15, wherein the unlatch force applied by the at least one tailgate latch actuator is less that the internal resistance of the tailgate latch when the external load applied to the tailgate is greater than the maximum external load.

* * * * *